Aug. 20, 1935.　　　　N. A. DILL　　　　2,012,241
SNAP FASTENER DEVICE
Filed March 31, 1934
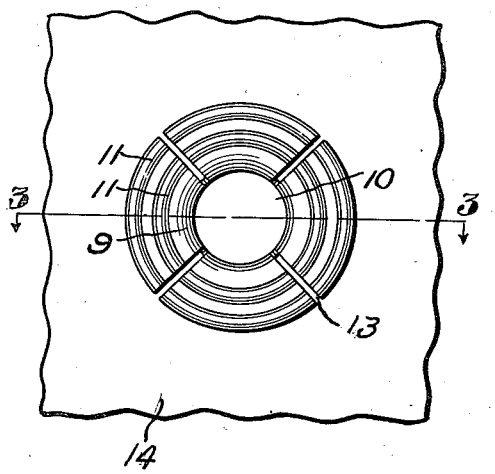
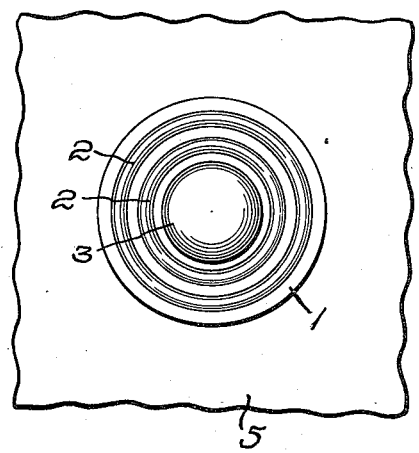
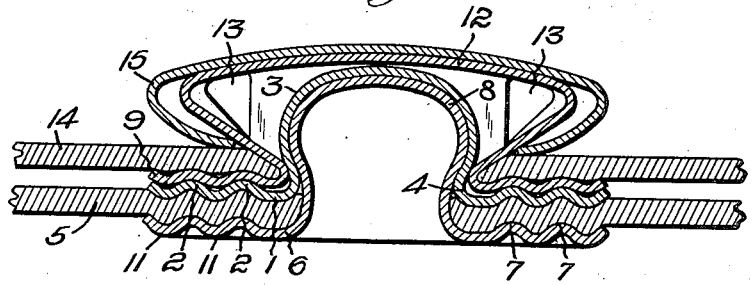
Inventor:
Norman A. Dill,
by Walter S. Jones
Atty.

Patented Aug. 20, 1935

2,012,241

UNITED STATES PATENT OFFICE 2,012,241

SNAP FASTENER DEVICE

Norman A. Dill, Belmont, Mass., assignor to United-Carr Fastener Corporation, Cambridge, Mass., a corporation of Massachusetts Application March 31, 1934, Serial No. 718,373

5 Claims. (Cl. 24—216)

My invention aims to provide improvements in snap fastener devices.

In the drawing which illustrates a preferred embodiment of my invention:—

Figure 1 is a plan view of a snap fastener socket attached to a carrying medium and showing the corrugated flange of the socket;

Fig. 2 is a plan view of the stud installation for engagement with the socket installation showing the cooperating corrugated flange; and Fig. 3 is an enlarged section taken on the line 3—3 of Figure 1 with the stud being engaged with the socket and also shown in cross-section.

The particular snap fastener members selected for illustration of my invention are well known to those skilled in the art with the exception of the corrugated flanges of the various parts which flanges provide a new and useful snap fastener structure which I claim to be my invention. Heretofore, the flanges of the type of snap fastener illustrated have presented smooth surfaces. I have found that by providing the contacting flanges of the socket and stud with interlocking ribs and grooves the fastener parts are much stronger and are prevented from lateral separation because of the interlocking engagement.

The stud member illustrated in Figs. 2 and 3 is formed from a single piece of sheet metal and is provided with a base flange 1 having a series of concentrically arranged corrugations 2, a head 3 and a neck 4. This stud member is attached to any suitable carrying medium, such, for instance, as a flexible material 5, by means of an attaching member provided with a flange 6 having a series of concentrically arranged corrugations 7 and an attaching shank 8. The attaching shank 8 passes through the carrying medium and has its end upset in the enlarged end or head 3 of the fastener stud, as best shown in Fig. 3. The corrugations formed in the flanges 1 and 6 of the stud and attaching parts, respectively, are preferably so arranged that the carrying medium 5 is interlocked with the corrugations to prevent it from being pulled out from between those flanges when lateral stress is exerted upon the carrying medium. The corrugations, therefore, provide a stronger attachment of the parts of the stud installation to the carrying medium.

The cooperating socket member has a flange 9 surrounding a stud-receiving aperture 10 and provided with a series of concentrically arranged corrugations 11. The socket is also provided with a tubular shank more or less in the form of a dome 12 and this dome, together with the flange 9, is divided by slits 13 extending from near the top of the dome to the outer peripheral edge of the flange 9, as shown in Figure 1. The socket is attached to a carrying medium 14 by a hollow cap 15 within which the upper end of the dome is spread outwardly (Fig. 3) after passing through the carrying medium 14.

When the stud and socket are snapped into engagement with one another, as illustrated by Fig. 3, the ribs of the corrugations 11 enter the valleys of the corrugations 2 thereby forming a nesting or interlocking relationship, as best illustrated in Fig. 3. This interlocking of the corrugations prevents any substantial lateral movement of the stud member relative to the socket when stresses are exerted laterally upon the carrying mediums 5 and 14 in opposite directions thereby helping to keep the stud and socket in engagement against accidental separation. It will be seen from the description and illustration of my invention that it relates primarily to the interlocking engagement of contacting flanges and also to the nesting arrangement of flanges of a fastener installation with an interposed carrying medium that of necessity takes a corrugated form thereby strengthening the installation.

While I have shown my invention in connection with a yieldable socket and a rigid stud member, it should be understood that my invention may be used with other suitable types of fastener members and therefore my invention is best defined by the following claims.

I claim:

1. A snap fastener device including a stud member and a cooperating socket member, said stud member having a base, a head and a neck and said base having a plurality of circular ribs, said socket having a front face surrounding a stud-receiving aperture, and said front face having a plurality of circular ribs adapted to engage between the ribs on the stud base when the stud and socket are engaged, said cooperating ribs interlocking to prevent separation of the stud and socket when under lateral stresses.

2. A snap fastener device including a stud member and a cooperating socket member, said stud member having a base, a head and a neck, said base having a plurality of concentrically arranged circular ribs, said socket having a front face surrounding a stud-receiving aperture, said front face having a plurality of concentrically arranged ribs adapted to engage between the ribs on the stud base when the stud and socket are engaged, said cooperating ribs interlocking to prevent separation of the stud and socket when under lateral stresses.

3. A snap fastener device including a stud member and a cooperating socket member, said stud member having a base, a head and a neck, said base having a plurality of circular corrugations, said socket having a front face surrounding a stud-receiving aperture and provided with a plurality of circular corrugations adapted to interlock with the corrugations on the base of the stud when the stud and socket are engaged for the purposes described.

4. A snap fastener member installation including a snap fastener part, a carrying medium and an attaching part, the snap fastener part having a flange portion located at one side of the carrying medium and provided with a plurality of circular corrugations and the attaching member having a flange at the opposite side of the carrying medium, said flange being provided with a plurality of circular corrugations nesting with the corrugations of the flange on the fastener part thereby gripping the carrying medium tightly between the corrugations to prevent the carrying medium from being pulled from between said flanges under normal lateral stresses.

5. A snap fastener member installation including a snap fastener part, a carrying medium and an attaching part, the snap fastener part having a flange portion located at one side of the carrying medium and provided with a plurality of circular corrugations and the attaching member having a flange at the opposite side of the carrying medium, said flange being provided with a plurality of circular corrugations nesting with the corrugations of the flange on the fastener part thereby gripping the carrying medium tightly between the corrugations to prevent the carrying medium from being pulled from between said flanges under normal lateral stresses and a cooperating snap fastener member for snap fastening engagement with the first mentioned snap fastener member and provided with a corrugated flange which has the corrugations thereof interlocking with those of the flange of the first mentioned snap fastener part.

NORMAN A. DILL.